(12) United States Patent
Wang et al.

(10) Patent No.: US 12,253,711 B2
(45) Date of Patent: Mar. 18, 2025

(54) BACKLIGHT MODULE, DISPLAY MODULE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Dake Wang, Beijing (CN); Tianma Li, Beijing (CN); Liang Li, Beijing (CN); Xiaoli Liu, Beijing (CN); Xuefeng Ding, Beijing (CN); Qijun Zhang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/026,086

(22) PCT Filed: Apr. 19, 2022

(86) PCT No.: PCT/CN2022/087759
§ 371 (c)(1),
(2) Date: Mar. 13, 2023

(87) PCT Pub. No.: WO2023/201544
PCT Pub. Date: Oct. 26, 2023

(65) Prior Publication Data
US 2024/0310573 A1  Sep. 19, 2024

(51) Int. Cl.
*F21V 8/00* (2006.01)
*G02F 1/1333* (2006.01)
*G02F 1/13357* (2006.01)

(52) U.S. Cl.
CPC ..... *G02B 6/0088* (2013.01); *G02F 1/133308* (2013.01); *G02F 1/1336* (2013.01)

(58) Field of Classification Search
CPC ............ G02B 6/0088; G02F 1/133308; G02F 1/1336
See application file for complete search history.

(56) References Cited

U.S. PATENT DOCUMENTS

| 2013/0003283 A1 | 1/2013 | Sakamoto |
| 2016/0239049 A1 | 8/2016 | Yuan |

(Continued)

FOREIGN PATENT DOCUMENTS

| CN | 102982736 A | 3/2013 |
| CN | 203757633 U | 8/2014 |

(Continued)

*Primary Examiner* — Elmito Breval
(74) *Attorney, Agent, or Firm* — IPro, PLLC

(57) ABSTRACT

A backlight module includes a back plate, a backlight component, and a rigid rear shell. The back plate includes a bottom plate and a vertical plate enclosing a mounting space. The backlight component is located in the mounting space and fixedly connected with the back plate. The rigid rear shell covers a side of the back plate away from the backlight component. The rigid rear shell includes a function part, a preset gap exists between the function part and the bottom plate. The bottom plate has a first connecting part including a first screw hole. The function part has a second connecting part including a second screw hole. The first connecting part and the second connecting part are connected through a fixing screw penetrating into the first screw hole and the second screw hole. A first gap exists between the first connecting part and the second connecting part.

17 Claims, 7 Drawing Sheets

(56) References Cited

U.S. PATENT DOCUMENTS

| | | | | |
|---|---|---|---|---|
| 2017/0123260 | A1* | 5/2017 | Kim | G02F 1/133308 |
| 2019/0129253 | A1* | 5/2019 | Moon | G02F 1/133514 |
| 2021/0018956 | A1 | 1/2021 | Fu | |
| 2021/0063805 | A1 | 3/2021 | Xia | |
| 2021/0191184 | A1 | 6/2021 | Zhang et al. | |
| 2022/0011635 | A1 | 1/2022 | Okitsu | |

FOREIGN PATENT DOCUMENTS

| | | |
|---|---|---|
| CN | 104317076 A | 1/2015 |
| CN | 204537092 U | 8/2015 |
| CN | 207704160 U | 8/2018 |
| CN | 208937863 U | 6/2019 |
| CN | 110543038 A | 12/2019 |
| CN | 210670872 U | 6/2020 |
| CN | 113917724 A | 1/2022 |
| JP | 2011086394 A | 4/2011 |
| JP | 2018028503 A | 2/2018 |
| TW | 200732744 A | 9/2007 |

* cited by examiner

-- Prior Art --

BACKLIGHT MODULE, DISPLAY MODULE AND DISPLAY APPARATUS

CROSS-REFERENCE TO RELATED APPLICATIONS

This application is a National Stage of International Application No. PCT/CN2022/087759, filed Apr. 19, 2022, the entire content of which is hereby incorporated by reference.

FIELD

The present application relates to the technical field of display devices, in particular to a backlight module, a display module and a display apparatus.

BACKGROUND

In the related art, in a manufacturing process of a vehicle display module, in order to match an assembly shape of a system terminal, the vehicle display module needs to be delivered with a shell. As shown in FIG. 1, which is a schematic structural diagram of a vehicle display module at present, a rigid rear shell 01 is pasted on a cover plate 02 through double faced adhesive tape, a backlight module 03 and a liquid crystal display panel 04 are located between the rigid rear shell 01 and the cover plate 02, and a connection position of the backlight module 03 and the rigid rear shell 01 is free of a gap and is locked and fixed through a screw. In this structure, due to existence of a manufacturing tolerance during manufacturing of the backlight module 03 and the rigid rear shell 01, an assembly tolerance also exists during assembly, and when the rigid rear shell and the backlight module are fixed through a screw; deformation of the backlight module may be caused, which affects display uniformity of the whole display module.

SUMMARY

The present application provides a backlight module, a display module and a display apparatus. The backlight module can avoid deformation generated by interference of a second connecting part on a rigid rear shell on a back plate, so as to avoid light leakage.

In order to achieve the above purpose, the present application provides the following technical solution.

A backlight module includes a back plate, a backlight component, and a rigid rear shell.

The back plate includes a bottom plate and a vertical plate connected with an edge of the bottom plate. The vertical plate and the bottom plate enclose a mounting space.

The backlight component is located in the mounting space and fixedly connected with the back plate.

The rigid rear shell covers a side of the back plate away from the backlight component. The rigid rear shell includes a function part corresponding to the bottom plate and an edge part arranged around the back plate. A preset gap exists between the function part and the bottom plate.

The bottom plate of the back plate has at least one first connecting part. The first connecting part has a first screw hole. The function part of the rigid rear shell has second connecting part(s) in one-to-one correspondence to the at least one first connecting part. The second connecting part has a second screw hole corresponding to the first screw hole. The first connecting part and the second connecting part are connected through a fixing screw penetrating into the first screw hole and the second screw hole. A first gap exists between the first connecting part and the second connecting part.

The backlight module provided by the present application includes the back plate, the backlight component and the rigid rear shell. The backlight component is mounted in the mounting space of the back plate. The rigid rear shell covers the side of the back plate away from the backlight component. The bottom plate of the back plate has at least one first connecting part. The first connecting part has the first screw hole. The function part of the rigid rear shell has the second connecting part(s) in one-to-one correspondence to the at least one first connecting part. The second connecting part has the second screw hole corresponding to the first screw hole. A manufacturing tolerance exists in thicknesses of the back plate and the rigid rear shell. In an assembly process, an assembly tolerance exists in positions of the back plate and the rigid rear shell in a direction of the rigid rear shell pointing to the back plate. The first gap exists between the first connecting part and the second connecting part, and when the back plate and the rigid rear shell are fixed through the fixing screw, deformation of the backlight module generated by interference of the second connecting part on the rigid rear shell on the back plate can be avoided, so as to avoid the light leakage of the backlight module.

Optionally, the first connecting part is a convex hull protruding towards the rigid rear shell. An end of the convex hull away from the bottom plate has a plane part opposite to the rigid rear shell. The plane part has the first screw hole, and the first gap exists between the plane part and the second connecting part.

Optionally, a diameter of the second screw hole is greater than that of the first screw hole.

Optionally, a relation between a design dimension of the diameter of the second screw hole and a design dimension of the diameter of the first screw hole is $D2-a \geq D1+2\times Z$. $D1$ is the design dimension of the diameter of the first screw hole. $D2$ is the design dimension of the diameter of the second screw hole, "a" is a manufacturing tolerance of the second screw hole, and $Z$ is a deviation tolerance between a center of the first screw hole and a center of the second screw hole.

Optionally, the fixing screw includes a nut and a threaded rod. The threaded rod penetrates into the first screw hole and the second screw hole. The nut is located on a side of the second connecting part away from the bottom plate, and an orthographic projection of the nut on the rigid rear shell covers the second screw hole.

Optionally, a relation between a design dimension of a maximum outer diameter of the nut and a design dimension of the diameter of the second screw hole is: $D3-b \geq D2+2\times Z$. $D3$ is the design dimension of the maximum outer diameter of the nut, and 'b' is a manufacturing tolerance of the nut.

Optionally, a relation between a design dimension of a length of the threaded rod and lengths of the first screw hole and the second screw hole in extension directions of center lines of the first screw hole and the second screw hole is: $L1 \leq H1+H2+H3$. $L1$ is the design dimension of the length of the threaded rod, $H1$ is the length of the first screw hole in the extension direction of the center line of the first screw hole, $H2$ is a dimension of the first gap, and $H3$ is the length of the second screw hole in the extension direction of the center line of the second screw hole.

Optionally, the length of the first screw hole in the extension direction of the center line of the first screw hole is smaller than a thickness of the convex hull in the extension direction of the first screw hole. A distance between a side of an outer wall of the first screw hole away from the rigid rear shell and a bottom end of the convex hull is greater than or equal to a manufacturing tolerance of the length of the threaded rod.

Optionally, a nut slot is formed in a region of the second connecting part corresponding to the nut. A relation between a design dimension of a diameter of the nut slot and the design dimension of the maximum outer diameter of the nut is: $D4-e \geq D3+2 \times Z$. D4 is the design dimension of the diameter of the nut slot, and 'e' is a manufacturing tolerance of the diameter of the nut slot.

The present application further provides a display module, including any backlight module provided in the above technical solutions. The backlight module further includes an adhesive frame. The adhesive frame is located on a side of the vertical plate of the back plate away from the bottom plate. The adhesive frame is fixedly connected with the vertical plate. The adhesive frame includes a supporting part and a frame part arranged perpendicular to the supporting part. The supporting part is located on a side of the backlight component away from the bottom plate. The supporting part has an opening corresponding to a light emitting region of the backlight component. The frame part is located on a side of the supporting part away from the backlight component, and the frame part and the supporting part are matched to enclose a containing space.

The display module further includes a cover plate. The cover plate is located on a side of the backlight module away from the rigid rear shell. A surface of the frame part of the adhesive frame oriented towards the cover plate and the cover plate are bonded through a first bonding piece. The edge part of the rigid rear shell is arranged around the backlight module. A surface of the edge part oriented towards the cover plate and the cover plate are bonded through a second bonding piece.

Optionally, the display module further includes a liquid crystal display panel. The liquid crystal display panel is located in the containing space. A display surface of the liquid crystal display panel is opposite to the cover plate and is bonded with the cover plate. An edge region of the liquid crystal display panel is connected with at least one flexible circuit board. A hollowed-out region is formed in a region of the frame part of the adhesive frame corresponding to the flexible circuit board. The flexible circuit board penetrates out of the containing space from the hollowed-out region to be reversely folded to a side of the backlight module away from the cover plate.

A surface, except for the hollowed-out region, of the frame part oriented towards the cover plate and the cover plate are bonded through the first bonding piece.

Optionally, the first bonding piece is a circle of first double faced adhesive tape arranged around the containing space, and the first double faced adhesive tape has a cut-off region corresponding to the hollowed-out region.

Optionally, a frame body of the frame part includes a plurality of corner regions corresponding to a plurality of corners of the liquid crystal display panel and straight-side regions except for the corner regions. The straight-side regions of the frame part and the cover plate are bonded through the first bonding piece. Light shielding pieces are bonded to surfaces of the corner regions of the frame part oriented towards the cover plate. Surfaces of the light shielding pieces oriented towards the cover plate are not connected with the cover plate. The light shielding pieces and the cover plate are in interference fit. An orthographic projection of the first bonding piece on the frame part and orthographic projections of the light shielding pieces on the frame part are coincided with a region of the frame part except for the hollowed-out region.

Optionally, the first bonding piece is second double faced adhesive tape arranged on the straight-side regions of the frame part, and the light shielding pieces are first foam arranged on the corner regions of the frame part.

Optionally, the backlight module further includes a buffer piece. The buffer piece is arranged on a side of the supporting part oriented towards the containing space. The buffer piece is opposite to an edge of a non-display surface of the liquid crystal display panel. A second gap exists between the buffer piece and the non-display surface of the liquid crystal display panel.

Optionally; a size of the second gap is 0.1 mm to 0.15 mm.

Optionally, the buffer piece is a circle of second foam arranged opposite to a peripheral edge of the non-display surface of the liquid crystal display panel.

The present application provides a display apparatus, including any display module provided in the above technical solutions.

REFERENCE NUMERALS

Figure 1:
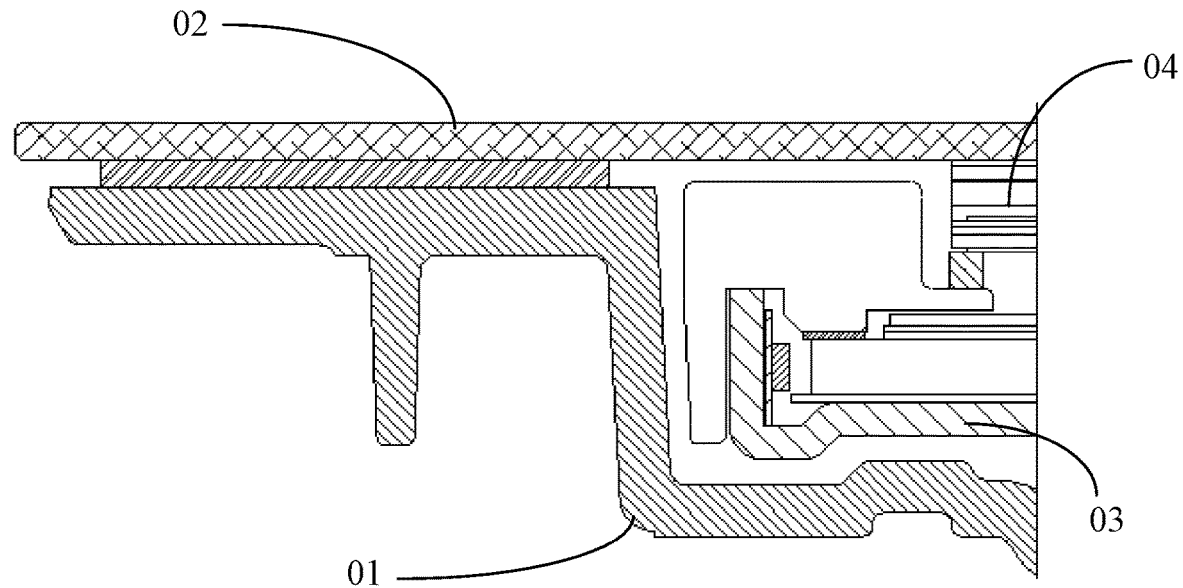
FIG. 1 is a schematic structural diagram of a display module in the related art.

11-adhesive frame; 111-supporting part; 112-frame part; AA-hollowed-out region; 12-buffer piece; 13-back plate; 131-first connecting part; 1311-plane part; 1312-first screw hole; 132-bottom plate; 133-vertical plate; 2-cover plate; 3-liquid crystal display panel; 31-flexible circuit board;

32-printed circuit board; 4-first bonding piece; 5-light shielding piece; 6-rigid rear shell; 61-function part; 610-second connecting part; 611-second screw hole; 612-nut slot; 62-edge part; 7-second bonding piece; 8-fixing screw; 81-nut; and 82-threaded rod.

DETAILED DESCRIPTION OF THE EMBODIMENTS

The technical solutions of the embodiments of the present application will be clearly and completely described below in conjunction with accompanying drawings of the embodiments of the present application. Obviously, the described embodiments are only part of embodiments of the present application, not all embodiments. Based on the embodiments in the present application, all other embodiments obtained by those ordinarily skilled in the art without performing creative labor fall within the scope of protection of the present application.

Please refer to FIG. 2 to FIG. 6, embodiments of the present application provide a backlight module, including: a back plate 13, a backlight component, and a rigid rear shell 6.

The back plate 13 includes a bottom plate 132 and a vertical plate 133 connected with an edge of the bottom plate. The vertical plate 133 and the bottom plate 132 enclose a mounting space.

The backlight component is located in the mounting space and fixedly connected with the back plate 13.

The rigid rear shell 6 covers a side of the back plate 13 away from the backlight component. The rigid rear shell 6 includes a function part 61 corresponding to the bottom plate 132 and an edge part 62 arranged around the back plate. A preset gap exists between the function part 61 and the bottom plate 132.

The bottom plate 132 of the back plate has at least one first connecting part 131. The first connecting part 131 has a first screw hole 1312. The function part 61 of the rigid rear shell 6 has second connecting part(s) 610 in one-to-one correspondence to the first connecting part(s). The second connecting part 610 has a second screw hole 611 corresponding to the first screw hole. The first connecting part 131 and the second connecting part 610 are connected through a fixing screw 8 penetrating into the first screw hole 1312 and the second screw hole 611, and a first gap exists between the first connecting part 131 and the second connecting part 610.

The backlight module provided by the embodiments of the present application includes the back plate 13, the backlight component and the rigid rear shell 6. The backlight component is mounted in the mounting space of the back plate. The rigid rear shell covers the side of the back plate away from the backlight component. The bottom plate 132 of the back plate has at least one first connecting part 131. The first connecting part 131 has the first screw hole 1312. The function part 61 of the rigid rear shell 6 has the second connecting part(s) 610 in one-to-one correspondence to the first connecting part(s). The second connecting part 610 has the second screw hole 611 corresponding to the first screw hole. A manufacturing tolerance exists in thicknesses of the back plate 13 and the rigid rear shell 6. In an assembly process, an assembly tolerance exists in positions of the back plate 13 and the rigid rear shell 6 in a direction of the rigid rear shell pointing to the back plate. The first gap exists between the first connecting part 131 and the second connecting part 610. When the back plate and the rigid rear shell are fixed through the fixing screw; deformation of the backlight module generated by interference of the second connecting part 610 on the rigid rear shell 6 on the back plate 13 can be avoided, so as to avoid light leakage of the backlight module.

The above backlight module may include an optical film material fixed on the bottom plate and a light strip fixed on an inner wall of the vertical plate. The optical film material may include a reflector plate, a light guide plate and a plurality of optical films which are sequentially stacked on the bottom plate. The light strip is arranged opposite to a side face of the light guide plate.

Figure 3:
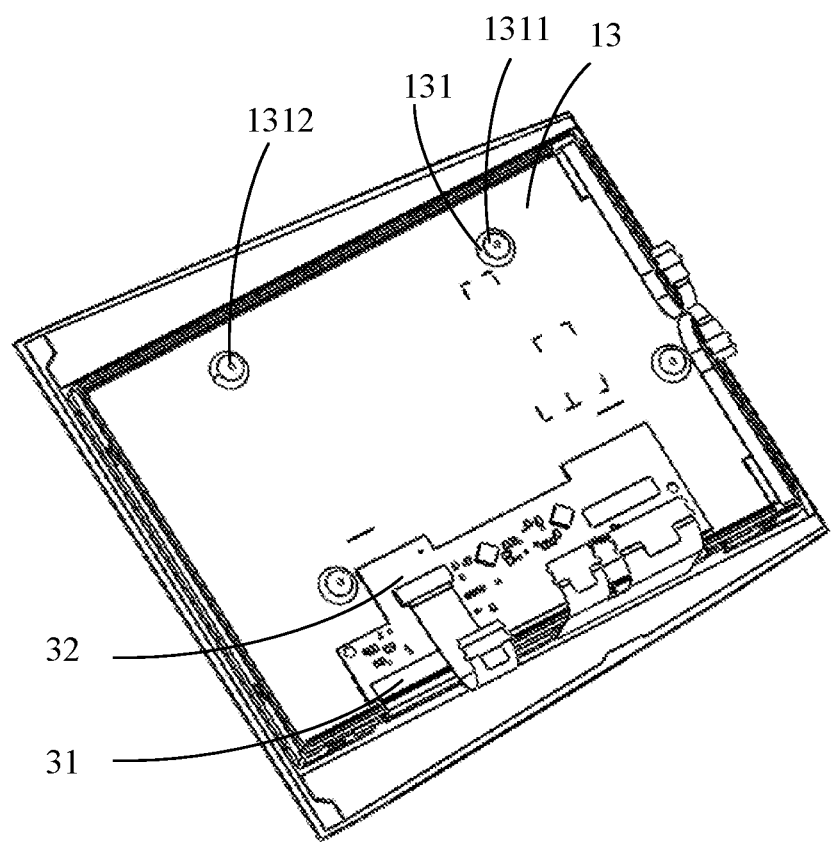
FIG. 3 is a space diagram of a display module provided by an embodiment of the present application.
Figure 4:
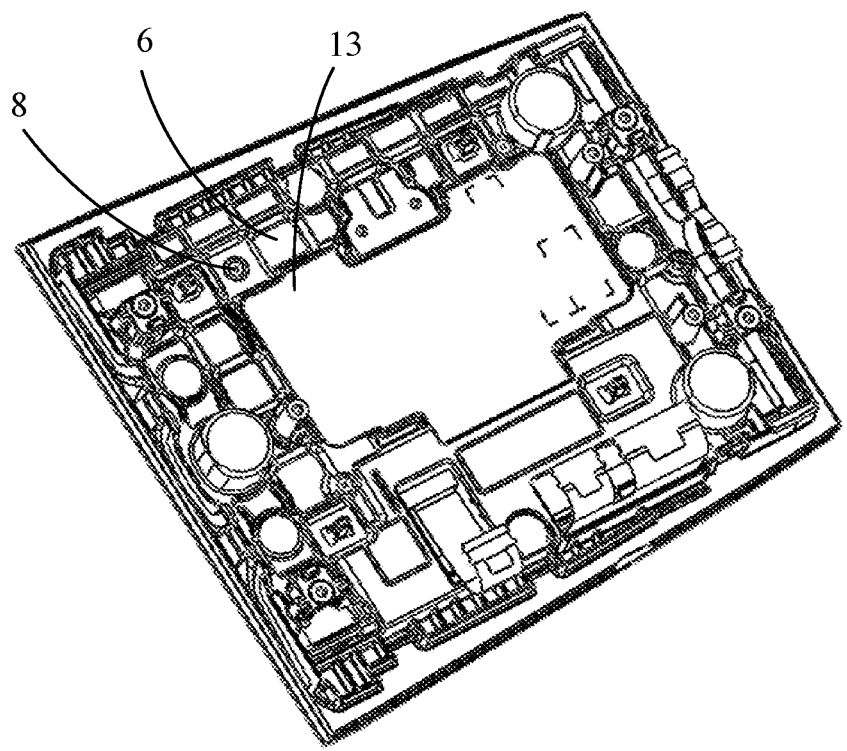
FIG. 4 is a space diagram of a display module provided by an embodiment of the present application.
Figure 5:
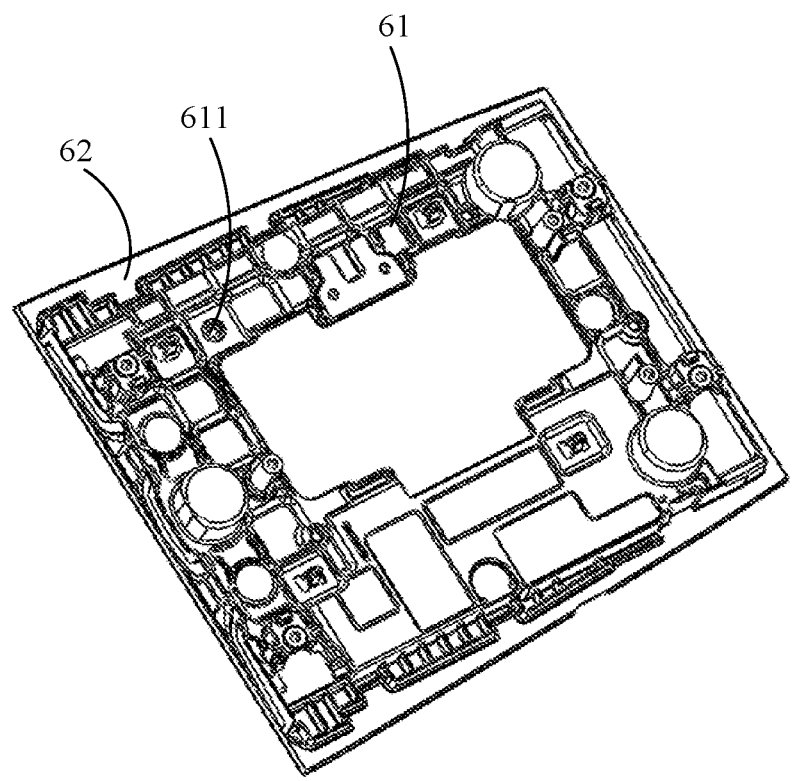
FIG. 5 is a schematic structural diagram of a rigid rear shell provided by an embodiment of the present application.
Figure 6:
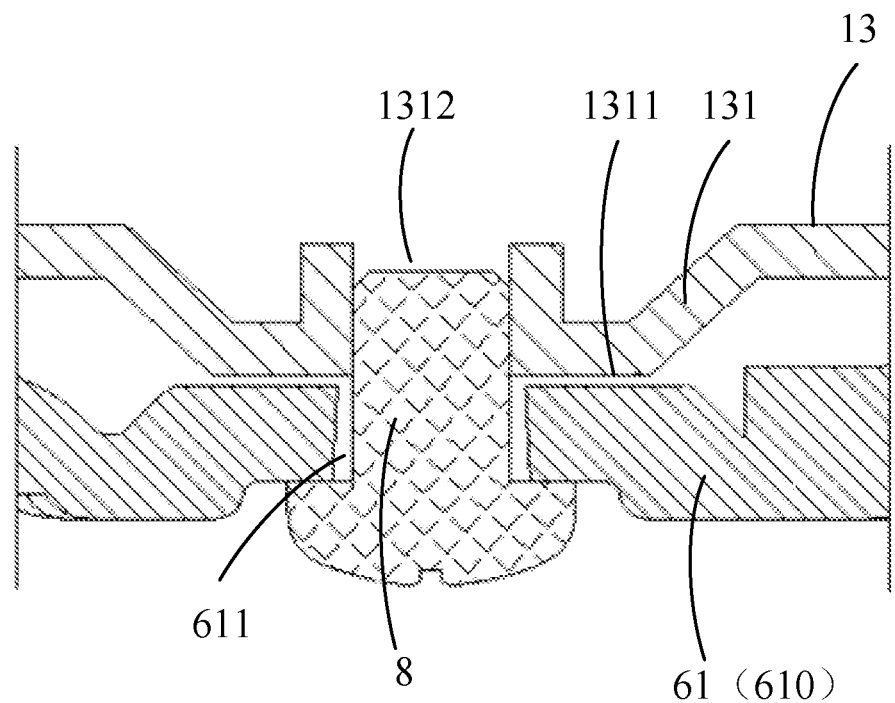
FIG. 6 is a schematic structural diagram of connection of a back plate and a rigid rear shell provided by an embodiment of the present application.

In implementations, as shown in FIG. 3 and FIG. 6, the first connecting part 131 may be a convex hull protruding towards the rigid rear shell. An end of the convex hull away from the bottom plate has a plane part 1311 opposite to the rigid rear shell. The plane part 1311 is provided with the first screw hole 1312. The first gap exists between the plane part 1311 and the second connecting part 610.

In the backlight module provided by the above embodiments, a manufacturing tolerance exists on the first screw hole 1312 on the back plate 13. A manufacturing tolerance also exists on the second screw hole 611 on the rigid rear shell. After the backlight module is assembled, a risk of mismatching of the first screw hole 1312 and the second screw hole 611 may appear. In order to reduce the risk of mismatching of the first screw hole 1312 and the second screw hole 611, it may be set as follows: as shown in FIG. 7, the diameter of the second screw hole 611 is greater than that of the first screw hole 1312, so that the diameter of the first screw hole 1312 and the diameter of the second screw hole 611 are reasonably designed.

Figure 7:
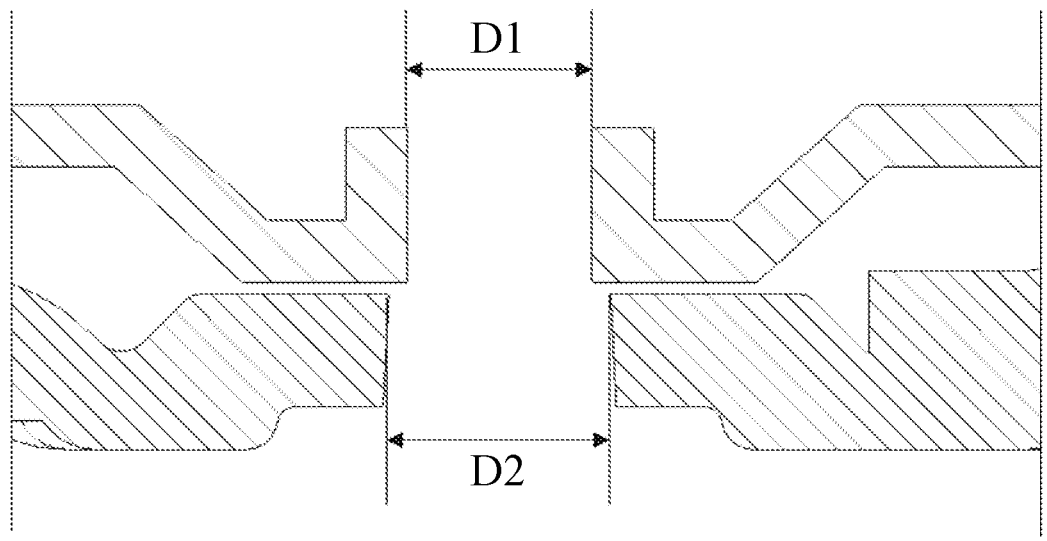
FIG. 7 is a schematic structural diagram of a first screw hole and a second screw hole provided by an embodiment of the present application.

In implementations, as shown in FIG. 7, a relation between a design dimension of the diameter of the second screw hole 611 and a design dimension of the diameter of the first screw hole 1312 may be $D2-a \geq D1+2 \times Z$. D1 is the design dimension of the diameter of the first screw hole 1312. D2 is the design dimension of the diameter of the second screw hole 611. "a" is a manufacturing tolerance of the second screw hole 611. Z is a deviation tolerance between a center of the first screw hole 1312 and a center of the second screw hole 611. It needs to be illustrated that selection of numerical values of the design dimension D1 of the diameter of the first screw hole 1312, the design dimension D2 of the diameter of the second screw hole 611, the manufacturing tolerance "a" of the second screw hole 611 and the deviation tolerance Z between the center of the first screw hole 1312 and the center of the second screw hole 611 may be decided according to actual conditions, which is not limited here.

Figure 8:
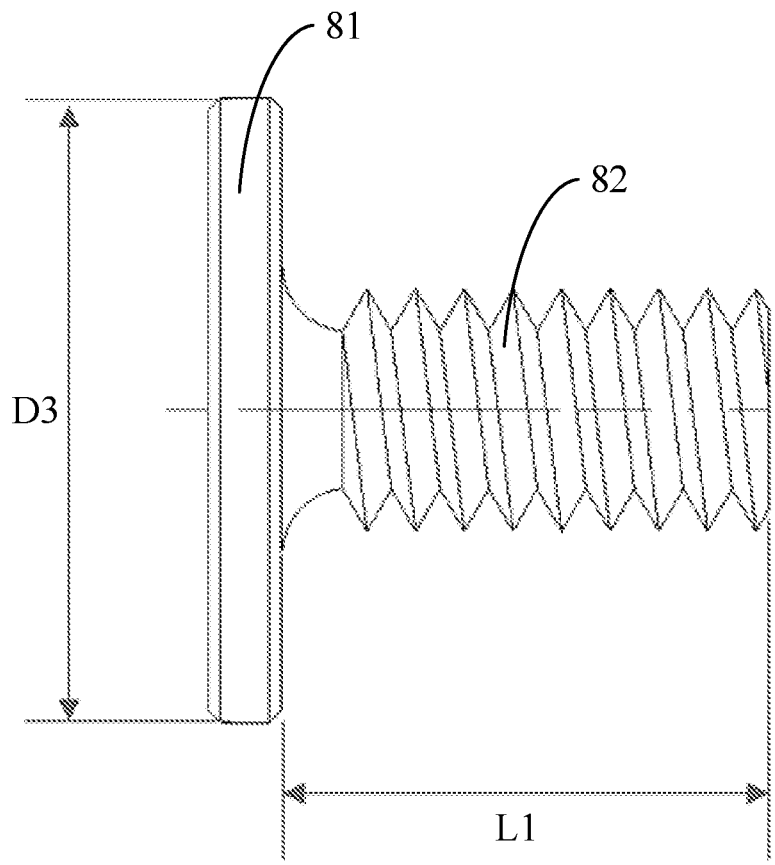
FIG. 8 is a schematic structural diagram of a fixing screw provided by an embodiment of the present application.
Figure 9:
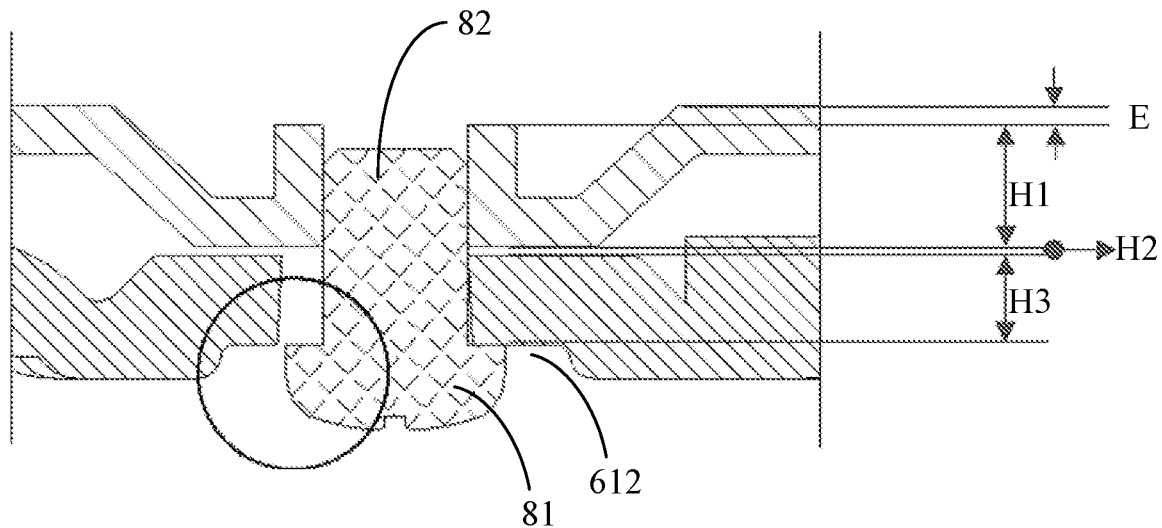
FIG. 9 is a schematic structural diagram of connection of a back plate and a rigid rear shell provided by an embodiment of the present application.

In the backlight module provided by the above embodiments, as shown in FIG. 8, the fixing screw 8 may include a nut 81 and a threaded rod 82. The threaded rod 82 penetrates into the first screw hole 1312 and the second screw hole 611. The nut 81 is located on a side of the second connecting part away from the back plate 13. Due to a combination tolerance of the backlight module and the rigid rear shell 6, a phenomenon that the nut 81 of the fixing screw 8 is designed too small to cover the second screw hole 611 on the rigid rear shell 6 may exist. As shown in FIG. 9, in order to avoid happening of this phenomenon, it may be designed that an orthographic projection of the nut 81 on the rigid rear shell 6 covers the second screw hole 611.

In implementations, as shown in FIG. 8, a relation between a design dimension of a maximum outer diameter of the nut 81 and a design dimension of the diameter of the second screw hole 611 is: $D3-b \geq D2+2 \times Z$. D3 is the design dimension of the maximum outer diameter of the nut 81. 'b' is a manufacturing tolerance of the nut 81. It needs to be illustrated that since a shape of the nut 81 on the fixing screw is not a strict cylindrical shape or spherical shape, outer diameters of all regions of the nut 81 are not completely the same. It requires that the orthographic projection of the nut 81 on the rigid rear shell 6 covers the second screw hole 611, and it needs to at least ensure that a region with the maximum outer diameter of the nut 81 can cover the second screw hole 611. The design dimension D3 of the maximum outer diameter of the nut 81 and the manufacturing tolerance 'b' of the nut 81 may be selected according to the actual conditions, which is not limited here.

In the backlight module provided by the above embodiments, in order to prevent a length of the threaded rod 82 of the fixing screw 8 from being too large, thereby touching an optical film material in the backlight component, the length of the threaded rod 82 needs to be designed. A relation between a design dimension of the length of the threaded rod 82 and lengths of the first screw hole 1312 and the second screw hole 611 in extension directions of self center lines is: L1≤H1+H2+H3. As shown in FIG. 8 and FIG. 9. L1 is the design dimension of the length of the threaded rod 82. H1 is the length of the first screw hole 1312 in the extension direction of its self center line. H2 is a dimension of the first gap. H3 is the length of the second screw hole 611 in the extension direction of its self center line. It can be ensured that in a process of fixing the rigid rear shell 6 and the back plate 13 by the fixing screw 8, the threaded rod 82 of the fixing screw does not penetrate through the first screw 1312, and interference of the threaded rod 82 on the optical film material in the backlight module is avoided. Numerical values of L1, H1, H2 and H3 may be selected according to the actual conditions, which is not limited here.

In implementations, since the length of the threaded rod 82 has the manufacturing tolerance, in order to further prevent the threaded rod 82 from affecting the optical film material in the backlight module, as shown in FIG. 9, it may be designed as follows: the length of the first screw hole 1312 in the extension direction of the self center line is smaller than a thickness of the convex hull in the extension direction of the first screw hole 1312, and a distance E between a side of an outer wall of the first screw hole 1312 away from the rigid rear shell 6 and a bottom end of the convex hull is greater than or equal to a manufacturing tolerance 'c' of the length of the threaded rod 82. The bottom end of the convex hull is an end of the convex hull connected with the back plate 13. Numerical values of E and 'c' may be set according to the actual conditions, which is not limited here.

Figure 10:
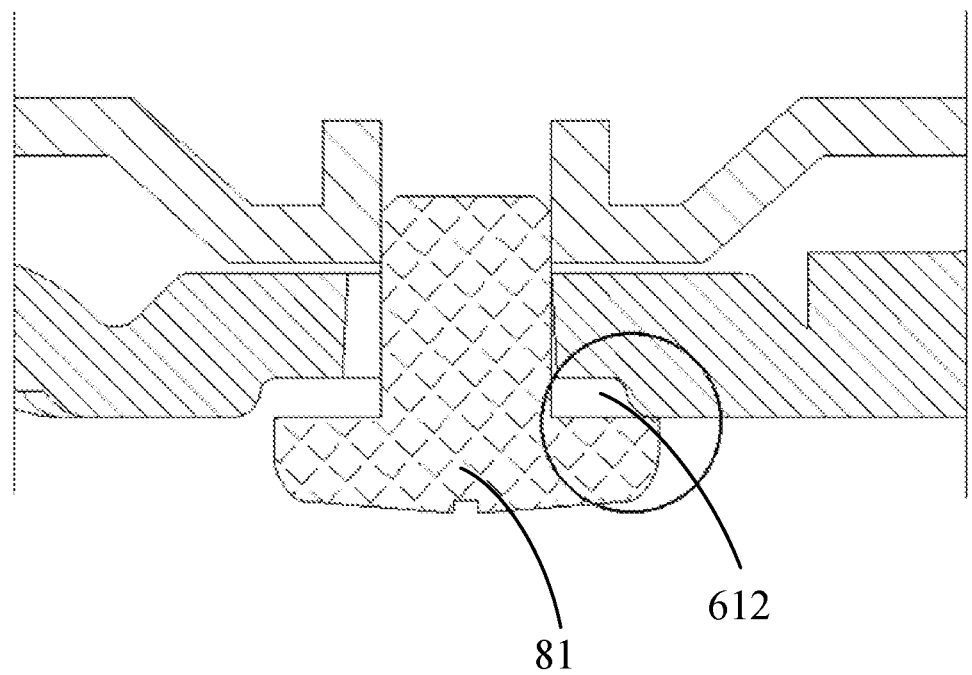
FIG. 10 is another schematic structural diagram of connection of a back plate and a rigid rear shell provided by an embodiment of the present application.
Figure 11:
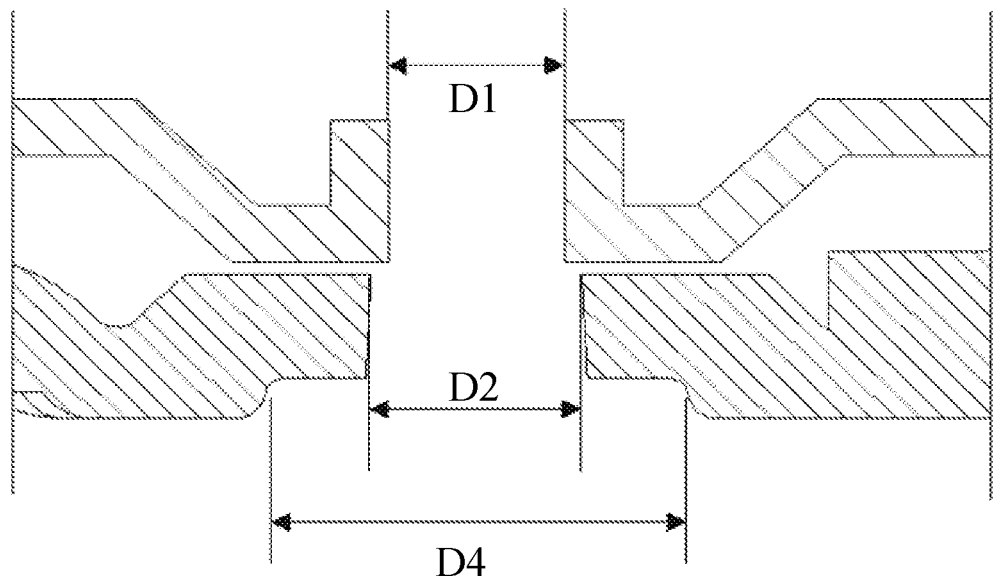
FIG. 11 is a schematic structural diagram of a back plate and a rigid rear shell provided by an embodiment of the present application.

In the backlight module provided by the above embodiments, a nut slot 612 is formed in a region of the second connecting part 610 corresponding to the nut 81. In order to prevent a situation that after the fixing screw 8 is mounted, the nut 81 cannot be correctly fixed into the nut slot 612, as shown in FIG. 10, it may be designed as follows: a relation between a design dimension of a diameter of the nut slot 612 and the design dimension of the maximum outer diameter of the nut 81 is: D4−e≥D3+2×Z. As shown in FIG. 11, D4 is the design dimension of the diameter of the nut slot 612. 'e' is a manufacturing tolerance of the diameter of the nut slot 612. Numerical values of D4 and 'e' may be set according to the actual conditions, which is not limited here.

Figure 2:
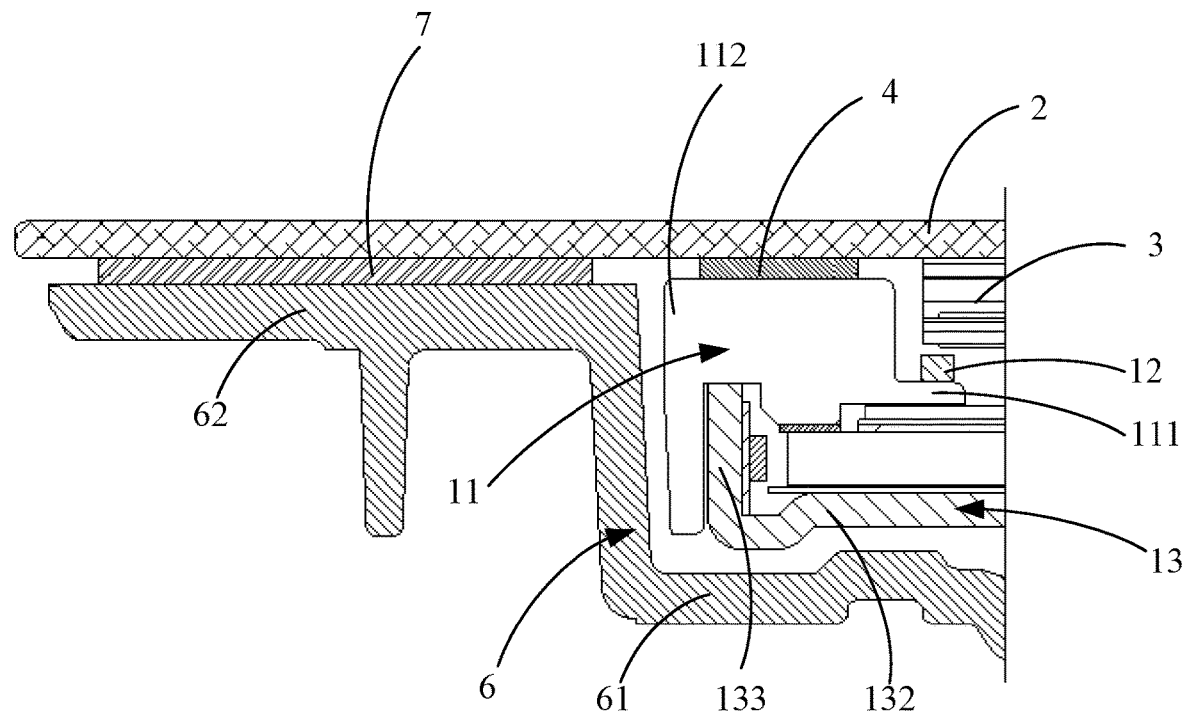
FIG. 2 is a schematic structural diagram of a display module provided by an embodiment of the present application.

The present application further provides a display module, including any backlight module provided in the above technical solutions. As shown in FIG. 2, the backlight module further includes an adhesive frame 11. The adhesive frame 11 is located on a side of a vertical plate 133 of a back plate 13 away from a bottom plate 132. The adhesive frame 11 is fixedly connected with the vertical plate 133. The adhesive frame 11 includes a supporting part 111 and a frame part 112 arranged perpendicular to the supporting part 111. The supporting part 111 is located on the side of the backlight component away from the bottom plate. The supporting part 111 has an opening corresponding to a light emitting region of the backlight component. The frame part 112 is located on a side of the supporting part 111 away from the backlight component. The frame part 112 and the supporting part 111 are matched to enclose a containing space.

The display module further includes a cover plate 2. The cover plate 2 is located on a side of the backlight module away from the rigid rear shell 6. A surface of the frame part 112 of the adhesive frame oriented towards the cover plate and the cover plate 2 are bonded through a first bonding piece 4. An edge part 62 of the rigid rear shell 6 is arranged around the backlight module. A surface of the edge part 62 oriented towards the cover plate and the cover plate 2 are bonded through a second bonding piece 7.

Figure 12:
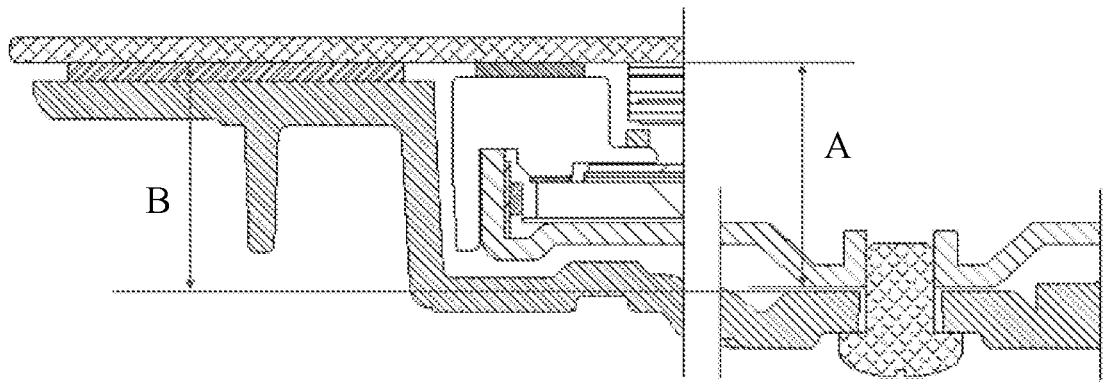
FIG. 12 is a schematic structural diagram of a display module provided by an embodiment of the present application.

In an assembly process of the display module, as shown in FIG. 12, a tolerance exists on a thickness A of the backlight module. A tolerance also exists on a distance B between a surface of the second screw hole 611 on the second connecting part 610 close to the back plate 13 and surfaces of the rigid rear shell 6 and the cover plate 2. If the surface of the second screw hole 611 on the second connecting part 610 close to the back plate 13 makes direct contact with the first connecting part 131 on the back plate 13, possibly resulting in interference of the second connecting part 610 on the back plate 13 caused by the thickness tolerance of the backlight module or the manufacturing tolerance of the rigid rear shell 6, consequently, the back plate is extruded to cause deformation of the backlight module, and light leakage is generated. The first gap is arranged between the second connecting part 610 and the first connecting part 131, the interference of the rigid rear shell 6 on the back plate 13 of the backlight module can be avoided, and light leakage of the display module is avoided.

The size of the first gap may be decided according to the thickness tolerance of the backlight module, and a tolerance of the distance between the surface of the second screw hole 611 of the rigid rear shell 6 close to the back plate 13 to a surface of the rigid rear shell 6 attached to the cover plate 2, which is not limited here, and decided according to the actual conditions.

The deviation tolerance Z of the center of the first screw hole 1312 and the center of the second screw hole 611 may be a combination tolerance of a position tolerance X of the first screw hole 1312 after the backlight module is bonded to the cover plate 2 and an assembly tolerance Y of the rigid rear shell 6 after the rigid rear shell 6 is attached to the cover plate 2. After the backlight module is bonded to the cover plate 2, the position tolerance X of the first screw hole 1312 may be the combination tolerance of the position tolerance of the first screw hole 1312 when a material of the backlight module is supplied and the assembly tolerance when the backlight module is bonded to the cover plate 2. A manufacturing tolerance 'a' exists on a size of the second screw hole 611 on the rigid rear shell 6, that is, the size of an actual diameter of the second screw hole 611 may be D2±a.

In the above display module, the surface of the frame part 112 of the adhesive frame oriented towards the cover plate and the cover plate 2 are bonded through the first bonding piece 4, so that there is no gap between the adhesive frame and the cover plate, a risk of existence of progressive foreign matter is reduced, and quality of the display module is improved. Moreover, bonding between the frame part 112 and the cover plate 2 enables the backlight module and the cover plate to be bonded. The position of the backlight module is fixed. Therefore assembly of other parts in the display module can be facilitated. For example, after the backlight module is assembled, the position of the backlight module is fixed, and then assembly of the rigid rear shell 6 covering the side of the backlight module away from the cover plate 2 is facilitated. The rigid rear shell 6 and the back plate 13 are fixedly connected through the fixing screw: so that the backlight module may be further fixed. In a process of vibration of the display module, falling of a backlight source caused by insufficient viscous force of the first bonding piece 4 can be avoided.

The above display module further includes a liquid crystal display panel 3. As shown in FIG. 2, the liquid crystal display panel 3 is located in the containing space. A display surface of the liquid crystal display panel 3 is opposite to the cover plate and is bonded with the cover plate 2. An edge region of the liquid crystal display panel 3 is connected with at least one flexible circuit board 31. A hollowed-out region AA is formed in a region of the frame part 112 of the adhesive frame corresponding to the flexible circuit board 31. The flexible circuit board 31 penetrates out of the containing space from the hollowed-out region AA to be reversely folded to the side of the backlight module away from the cover plate. A surface, except for the hollowed-out region AA, of the frame part 112 oriented towards the cover plate and the cover plate 2 are bonded through the first bonding piece 4. This structure can make that there is no gap between the frame part 112 except for the hollowed-out region AA and the cover plate 2, reduce a risk of existence of the progressive foreign matter and improve the quality of the display module. Moreover, bonding between the frame part 112 and the cover plate 2 enables the position of the backlight module to be fixed, and therefore assembly of other parts in the display module can be facilitated.

A printed circuit board 32 connected with the flexible circuit board may further be arranged between the bottom plate of the back plate 13 and the rigid rear shell 6, so as to achieve control over a display picture of the liquid crystal display panel.

In implementations, the first bonding piece 4 may be a circle of first double faced adhesive tape arranged around the containing space. The first double faced adhesive tape has a cut-off region corresponding to the hollowed-out region AA. Through the first double faced adhesive tape, regions of the frame part 112 of the adhesive frame 11 except for the hollowed-out region AA can be all sealed with the cover plate 2, so that the backlight source is fixedly connected with the cover plate 2, and the risk of existence of the progressive foreign matter can be reduced.

Figure 13:
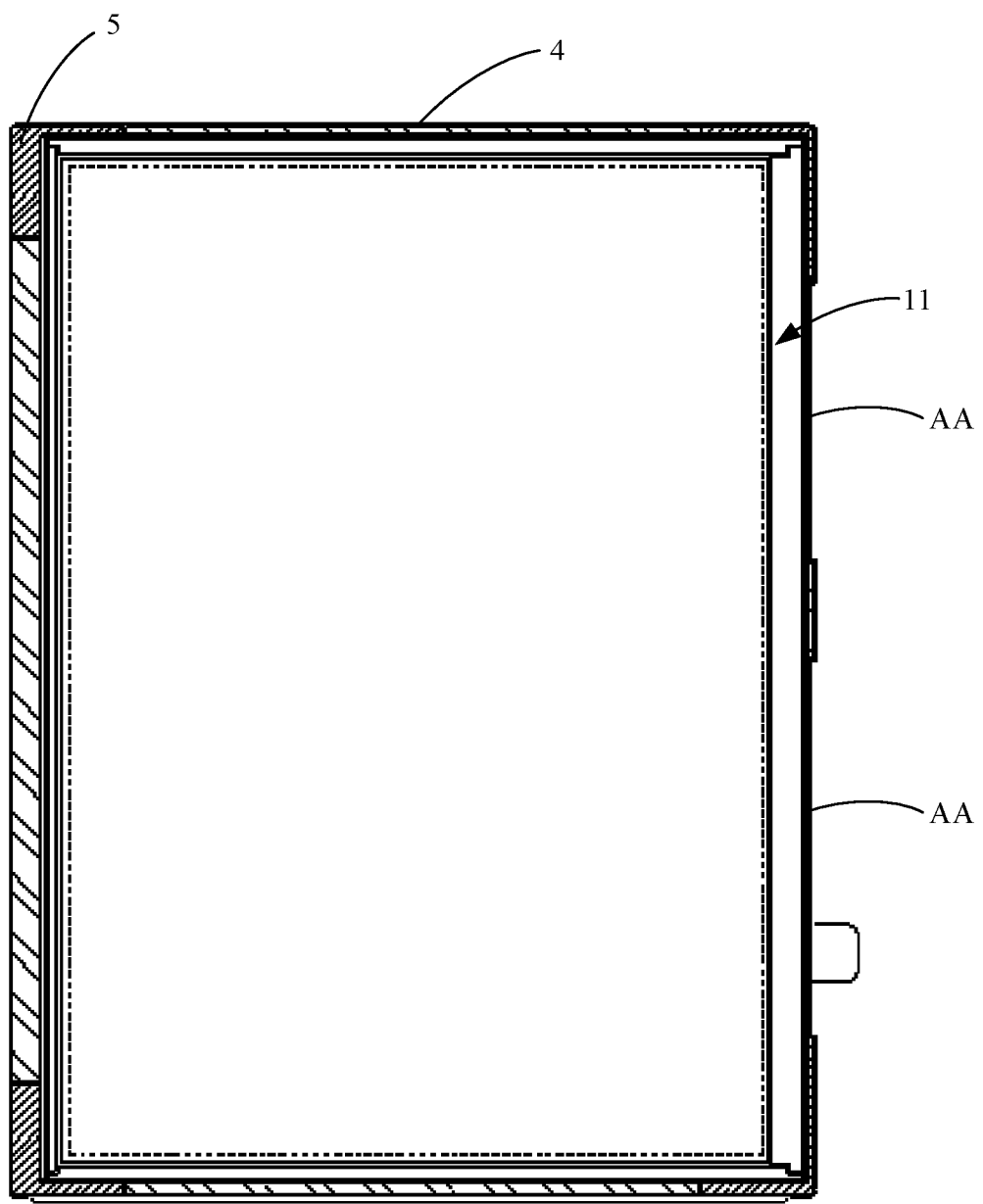
FIG. 13 is a schematic structural diagram of an adhesive frame provided by an embodiment of the present application.

In other implementations, a frame body of the frame part 112 may be divided into corner regions corresponding to corners of the liquid crystal display panel 3 and straight-side regions except for the corner regions. The straight-side regions of the frame part 112 and the cover plate 2 are bonded through the first bonding piece 4. Light shielding pieces 5 may be bonded to surfaces of the corner regions of the frame part 112 oriented towards the cover plate 2. Surfaces of the light shielding pieces 5 oriented towards the cover plate 2 are not connected with the cover plate 2. The light shielding pieces 5 and the cover plate 2 are in interference fit. An orthographic projection of the first bonding piece 4 on the frame part 112 and orthographic projections of the light shielding pieces 5 on the frame part 112 are coincided with a region of the frame part 112 except for the hollowed-out region AA, as shown in FIG. 13. The straight-line regions of the frame part 112 and the cover plate 2 are fixedly bonded through the first bonding piece 4, which can ensure fixing of positions of the backlight source and the cover plate 2, and reduce the risk of existence of the progressive foreign matter. Through bonding of the light shielding pieces 5 on the corner regions of the frame part 112, the light shielding pieces 5 and the cover plate 2 are in interference fit, so that the corner regions of the frame part 112 and the cover plate 2 are sealed, light leakage at four corners of the display module is prevented, and the quality of the display module is improved.

The first bonding piece 4 may be second double faced adhesive tape arranged on the straight-side regions of the frame part 112. The light shielding pieces 5 are first foam arranged on the corner regions of the frame part 112. The first foam can prevent light leakage at the corners of the display module. The first foam may be bonded with the frame part 112 through a bonding layer. For example, during assembly of the backlight module, the second double faced adhesive tape may be bonded to the straight-side regions of the frame part 112, the first foam is bonded to the corner regions of the frame part 112 through the bonding layer. A thickness of the first foam in a direction perpendicular to the supporting part 111 is greater than that of the second double faced adhesive tape in the direction perpendicular to the supporting part 111. After the cover plate 2 and the adhesive frame 11 of the backlight source are bonded through the second double faced adhesive tape, since the thickness of the first foam is greater than that of the second double faced adhesive tape, the first foam is extruded by the cover plate 2 to be compressed, and the first foam and the cover plate 2 are in interference fit.

For example, the thickness of the second double faced adhesive tape may be 0.4 mm, and the thickness of the first foam may be 0.45 mm. The thickness of the second double faced adhesive tape and the thickness of the first foam may not be limited here, and are decided according to the actual conditions.

The above second bonding piece 7 may be third double faced adhesive tape enabling the edge part 62 of the rigid rear shell 6 and the cover plate 2 to be attached.

The display module provided by the above embodiments, as shown in FIG. 2, further includes a buffer piece 12. The buffer piece 12 is arranged on a side of the supporting part 111 oriented towards the containing space. The buffer piece 12 is opposite to an edge of a non-display surface of the liquid crystal display panel 3. A second gap exists between the buffer piece 12 and the non-display surface of the liquid crystal display panel. Since the second gap exists between the buffer piece 12 and the non-display surface of the liquid crystal display panel 3, when the liquid crystal display panel 3 is pressed, the buffer piece 12 is not prone to extruding the liquid crystal display panel 3, a risk of generating dark-state light leakage can be reduced, and when the liquid crystal display panel 3 is excessively pressed to move, the liquid crystal display panel 3 can be supported, so that the liquid crystal display panel 3 is protected.

In implementations, the size of the above second gap may be 0.1 mm to 0.15 mm, so that the buffer piece 12 can protect the liquid crystal display panel 3. For example, the second gap may be set to be 0.1 mm, 0.12 mm or 0.15 mm, etc.

In implementations, the above buffer piece 12 may be a circle of second foam opposite to a peripheral edge of the non-display surface of the liquid crystal display panel 3. Through the second foam, when the liquid crystal display panel 3 moves, the liquid crystal display panel 3 may be supported, and the liquid crystal display panel 3 is protected against damage.

In implementations, the above liquid crystal display panel 3 may be a display panel integrating a touch function, and also may be a display panel without the touch function, which is not limited here. A structure of the liquid crystal display panel may have an array substrate and a color film substrate which are oppositely arranged, a liquid crystal layer located between the array substrate and the color film substrate, a first polarizer located on a side of the array substrate away from the color film substrate and a second polarizer located on a side of the color film substrate away from the array substrate. The whole display surface of the liquid crystal display panel 3 may be bonded with the cover plate 2 through transparent adhesive tape, so that the liquid crystal display panel 3 is fixed into the containing space, and it is ensured that the liquid crystal display panel 3 does not fall off in a vibration process.

Embodiments of the present application further provide a display apparatus, including any display module provided in the above technical solutions.

Obviously, those skilled in the art may make various alterations and variations on the embodiments of the present application without departing from the spirit and scope of the present application. Thus, if these modifications and variations on the embodiments of the present application fall within the scope of the claims of the present application and their equivalent technologies, the present application is also intended to include these modifications and variations.

What is claimed is:

1. A backlight module, comprising:
   a back plate, comprising:
     a bottom plate, and
     a vertical plate connected with an edge of the bottom plate,
     wherein the vertical plate and the bottom plate enclose a mounting space;
   a backlight component, located in the mounting space and fixedly connected with the back plate; and
   a rigid rear shell, covering a side of the back plate away from the backlight component;
   wherein the rigid rear shell comprises:
     a function part corresponding to the bottom plate, and an edge part arranged around the back plate;
     wherein a preset gap exists between the function part and the bottom plate;
   wherein the bottom plate of the back plate is provided with at least one first connecting part, the first connecting part is provided with a first screw hole, the function part of the rigid rear shell is provided with a second connecting part in one-to-one correspondence to the first connecting part, the second connecting part is provided with a second screw hole corresponding to the first screw hole, the first connecting part and the second connecting part are connected through a fixing screw penetrating into the first screw hole and the second screw hole, and a first gap exists between the first connecting part and the second connecting part;
   the first connecting part and the back plate are manufactured in one piece, the first connecting part is a convex hull protruding towards the rigid rear shell, an end of the first connecting part away from the rigid rear shell is connected with and flush with the bottom plate, an end of the convex hull away from the bottom plate is provided with a plane part opposite to the rigid rear shell, the plane part is provided with the first screw hole, and the first gap exists between the plane part and the second connecting part.

2. The backlight module according to claim 1, wherein a diameter of the second screw hole is greater than a diameter of the first screw hole.

3. The backlight module according to claim 2, wherein a relation between a design dimension of the diameter of the second screw hole and a design dimension of the diameter of the first screw hole is $D2-a>D1+2\times Z$;
   wherein $D1$ is the design dimension of the diameter of the first screw hole, $D2$ is the design dimension of the diameter of the second screw hole, $a$ is a manufacturing tolerance of the second screw hole, and $Z$ is a deviation tolerance between a center of the first screw hole and a center of the second screw hole.

4. The backlight module according to claim 3, wherein the fixing screw comprises:
   a nut, and
   a threaded rod,
   wherein the threaded rod penetrates into the first screw hole and the second screw hole, the nut is located on a side of the second connecting part away from the bottom plate, and an orthographic projection of the nut on the rigid rear shell covers the second screw hole.

5. The backlight module according to claim 4, wherein a relation between a design dimension of a maximum outer diameter of the nut and the design dimension of the diameter of the second screw hole is: $D3-b\geq D2+2\times Z$;
   wherein $D3$ is the design dimension of the maximum outer diameter of the nut, and $b$ is a manufacturing tolerance of the nut.

6. The backlight module according to claim 4, wherein a relation between a design dimension of a length of the threaded rod and lengths of the first screw hole and the second screw hole in extension directions of center lines of the first screw hole and the second screw hole is: $L1\leq H1+H2+H3$;
   wherein $L1$ is the design dimension of the length of the threaded rod, $H1$ is the length of the first screw hole in the extension direction of the center line of the first screw hole, $H2$ is a dimension of the first gap, and $H3$ is the length of the second screw hole in the extension direction of the center line of the second screw hole.

7. The backlight module according to claim 6, wherein the length of the first screw hole in the extension direction of the center line of the first screw hole is smaller than a thickness of the convex hull in an extension direction of the first screw hole, and a distance between a side of an outer wall of the first screw hole away from the rigid rear shell and a bottom end of the convex hull is greater than or equal to a manufacturing tolerance of the length of the threaded rod.

8. The backlight module according to claim 4, wherein a nut slot is formed in a region of the second connecting part corresponding to the nut, and a relation between a design dimension of a diameter of the nut slot and the design dimension of the maximum outer diameter of the nut is: $D4-e\geq D3+2\times Z$;
   wherein $D4$ is the design dimension of the diameter of the nut slot, and $e$ is a manufacturing tolerance of the diameter of the nut slot.

9. A display module, comprising a backlight module, wherein the backlight module comprises:
   a back plate, comprising:
     a bottom plate, and
     a vertical plate connected with an edge of the bottom plate, wherein the vertical plate and the bottom plate enclose a mounting space;

a backlight component, located in the mounting space and fixedly connected with the back plate;

a rigid rear shell, covering a side of the back plate away from the backlight component;

wherein the rigid rear shell comprises:
   a function part corresponding to the bottom plate, and an edge part arranged around the back plate;
   wherein a preset gap exists between the function part and the bottom plate; and an adhesive frame, located on a side of the vertical plate of the back plate away from the bottom plate and fixedly connected with the vertical plate;

wherein the adhesive frame comprises:
   a supporting part, and
   a frame part arranged perpendicular to the supporting part,
   wherein the supporting part is located on a side of the backlight component away from the bottom plate, the supporting part is provided with an opening corresponding to a light emitting region of the backlight component, the frame part is located on a side of the supporting part away from the backlight component, and the frame part and the supporting part are matched to enclose a containing space;

wherein the bottom plate of the back plate is provided with at least one first connecting part, the first connecting part is provided with a first screw hole, the function part of the rigid rear shell is provided with a second connecting part in one-to-one correspondence to the first connecting part, the second connecting part is provided with a second screw hole corresponding to the first screw hole, the first connecting part and the second connecting part are connected through a fixing screw penetrating into the first screw hole and the second screw hole, and a first gap exists between the first connecting part and the second connecting part; and the display module further comprises:
   a cover plate located on a side of the backlight module away from a rigid rear shell,
   wherein a surface of the frame part of the adhesive frame oriented towards the cover plate and the cover plate are bonded through a first bonding piece, the edge part of the rigid rear shell is arranged around the backlight module, and a surface of the edge part oriented towards the cover plate and the cover plate are bonded through a second bonding piece; wherein the surface of the edge part oriented towards the cover plate is perpendicular to an extension direction of the vertical plate.

10. The display module according to claim 9, further comprising:

a liquid crystal display panel in the containing space, wherein a display surface of the liquid crystal display panel is opposite to the cover plate and is bonded with the cover plate, an edge region of the liquid crystal display panel is connected with at least one flexible circuit board, a hollowed-out region is formed in a region of the frame part of the adhesive frame corresponding to the flexible circuit board, and the flexible circuit board penetrates out of the containing space from the hollowed-out region to be reversely folded to a side of the backlight module away from the cover plate; and a surface, except for the hollowed-out region, of the frame part oriented towards the cover plate and the cover plate are bonded through the first bonding piece.

11. The display module according to claim 10, wherein the first bonding piece is a circle of first double faced adhesive tape arranged around the containing space, and the first double faced adhesive tape is provided with a cut-off region corresponding to the hollowed-out region.

12. The display module according to claim 10, wherein a frame body of the frame part comprises:

a plurality of corner regions corresponding to a plurality of corners of the liquid crystal display panel, and straight-side regions except for the corner regions, wherein the straight-side regions of the frame part and the cover plate are bonded through the first bonding piece, light shielding pieces are bonded to surfaces of the corner regions of the frame part oriented towards the cover plate, surfaces of the light shielding pieces oriented towards the cover plate are not connected with the cover plate, the light shielding pieces and the cover plate are in interference fit, and an orthographic projection of the first bonding piece on the frame part and orthographic projections of the light shielding pieces on the frame part are coincided with a region of the frame part except for the hollowed-out region.

13. The display module according to claim 12, wherein the first bonding piece is second double faced adhesive tape arranged on the straight-side regions of the frame part, and the light shielding pieces are first foam arranged on the corner regions of the frame part.

14. The display module according to claim 10, wherein the backlight module further comprises:

a buffer piece, arranged on a side of the supporting part oriented towards the containing space and is opposite to an edge of a non-display surface of the liquid crystal display panel, wherein a second gap exists between the buffer piece and the non-display surface of the liquid crystal display panel.

15. The display module according to claim 14, wherein a size of the second gap is 0.1 mm to 0.15 mm.

16. The display module according to claim 14, wherein the buffer piece is a circle of second foam arranged opposite to a peripheral edge of the non-display surface of the liquid crystal display panel.

17. A display apparatus, comprising the display module according to claim 9.

\* \* \* \* \*